Feb. 28, 1967  G. W. SMALL  3,306,511
MACHINE FOR PRE-NAILING AND PRE-TACKING CARPET STRIPS
Filed April 19, 1965  5 Sheets-Sheet 1
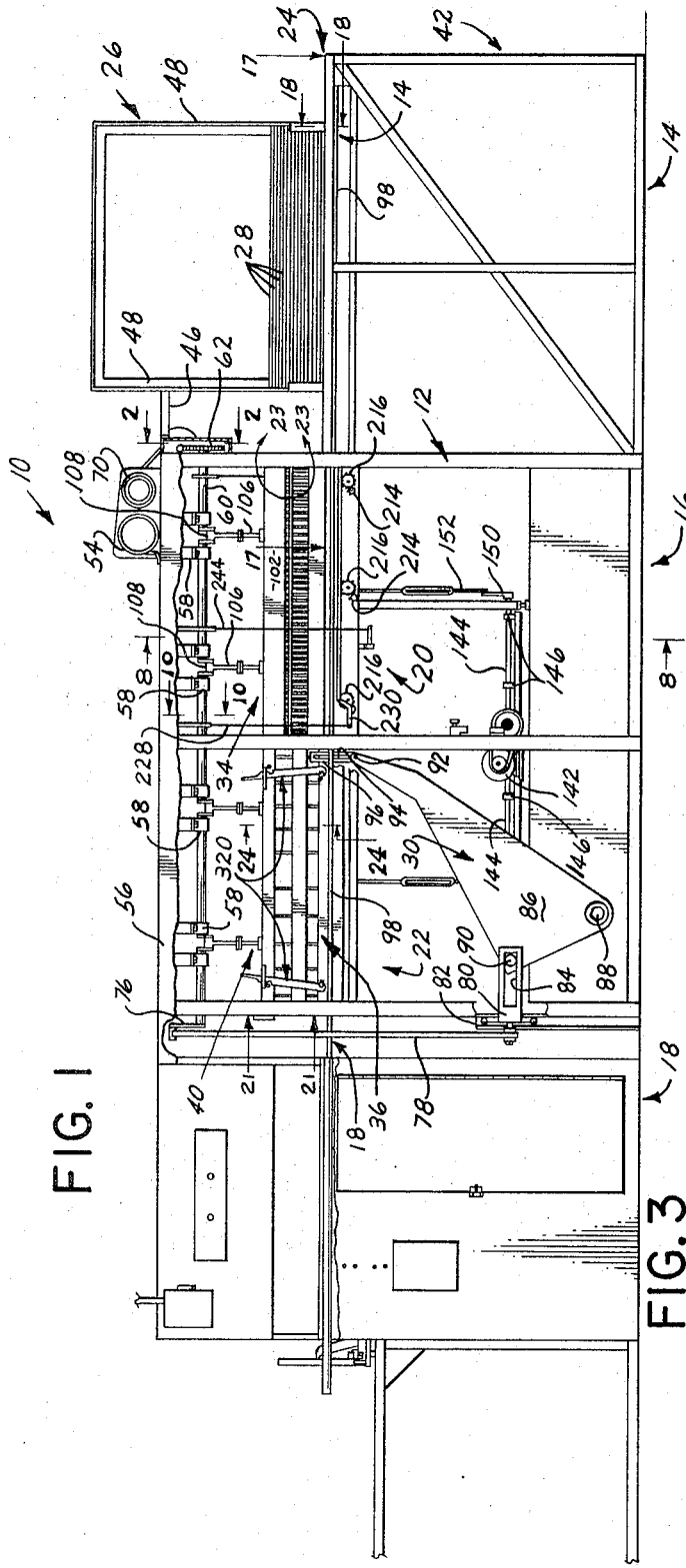
FIG. 1
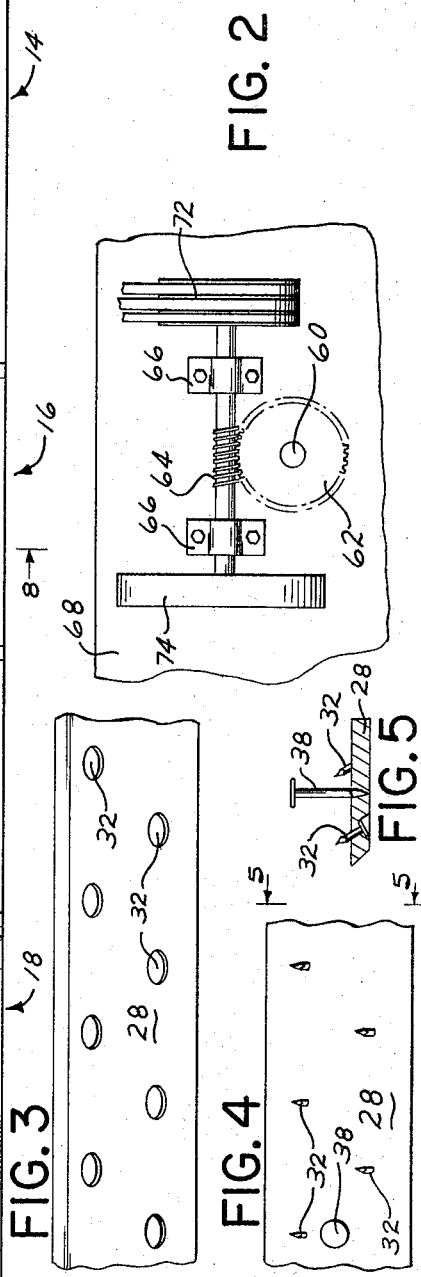
FIG. 2
FIG. 3
FIG. 4
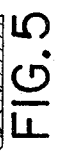
FIG. 5

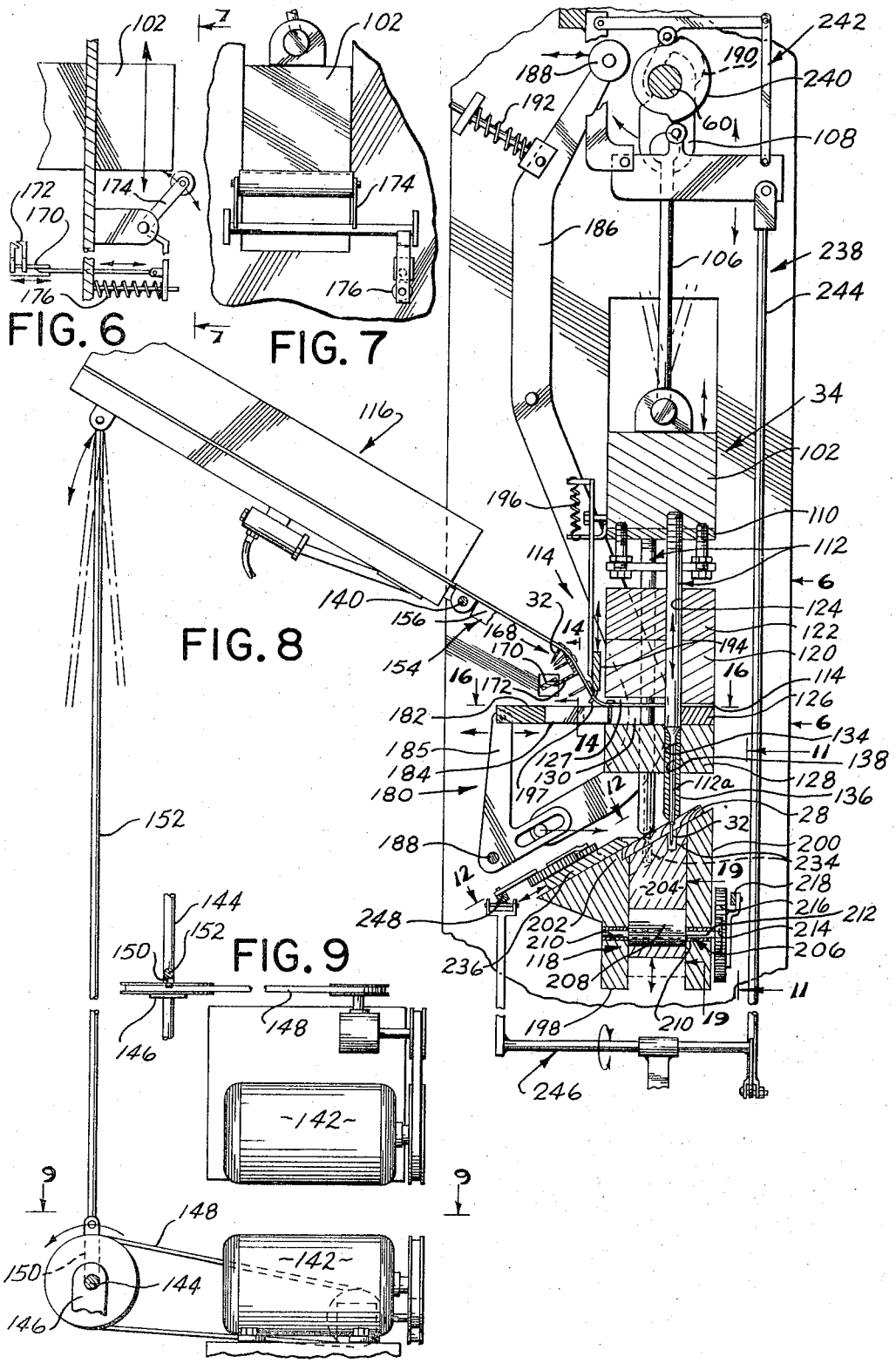

Feb. 28, 1967 G. W. SMALL 3,306,511
MACHINE FOR PRE-NAILING AND PRE-TACKING CARPET STRIPS
Filed April 19, 1965 5 Sheets-Sheet 3
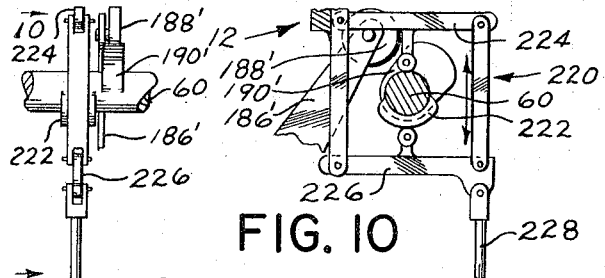
FIG. 10
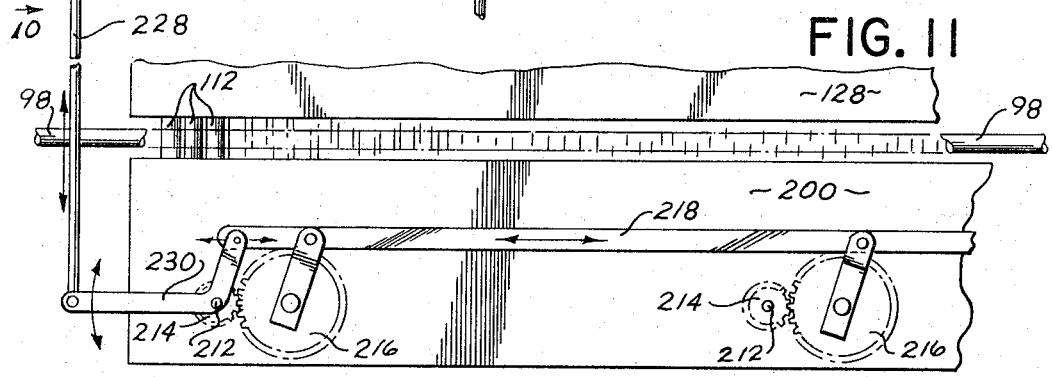
FIG. 11
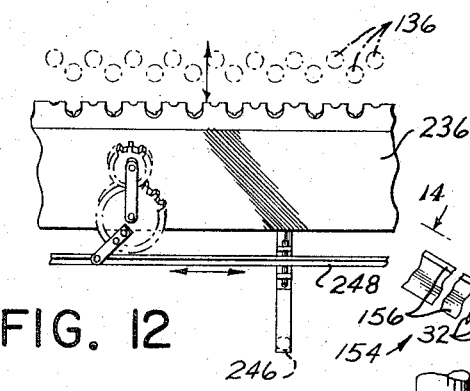
FIG. 12
FIG. 13
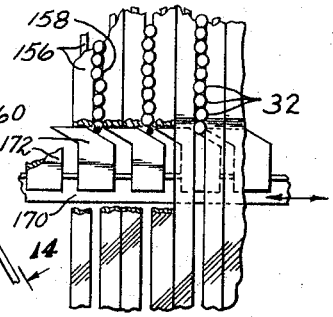
FIG. 14
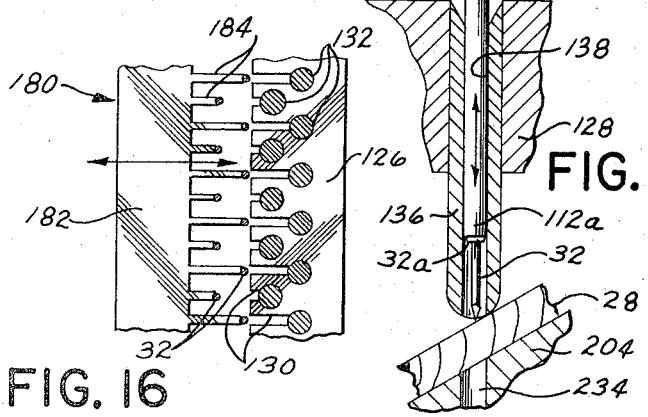
FIG. 15
FIG. 16

Feb. 28, 1967 G. W. SMALL 3,306,511
MACHINE FOR PRE-NAILING AND PRE-TACKING CARPET STRIPS
Filed April 19, 1965 5 Sheets-Sheet 4
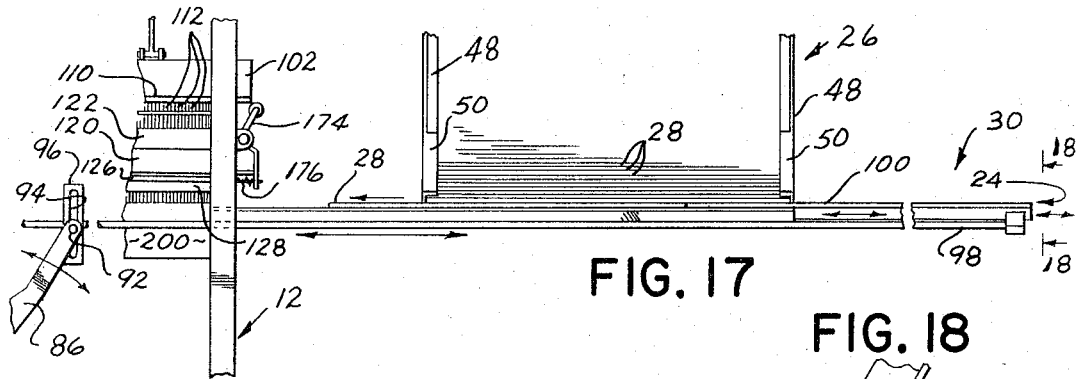
FIG. 17
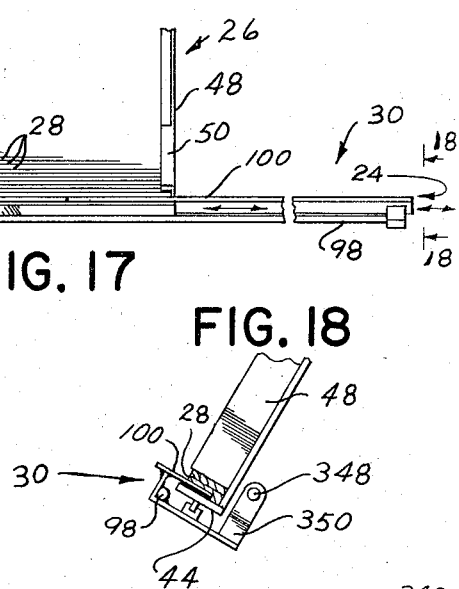
FIG. 18
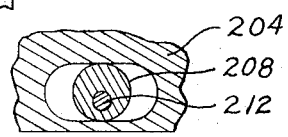
FIG. 19
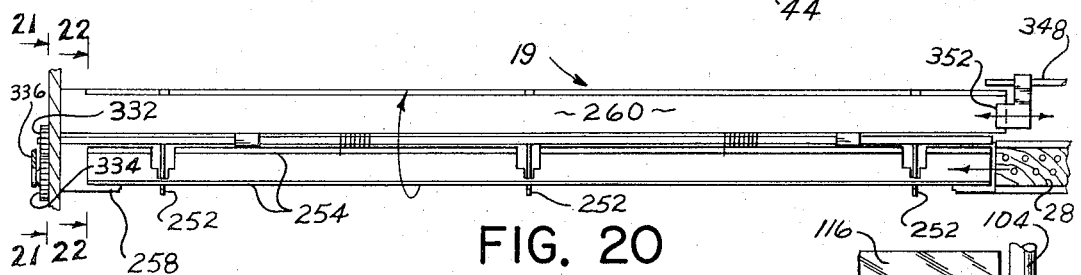
FIG. 20
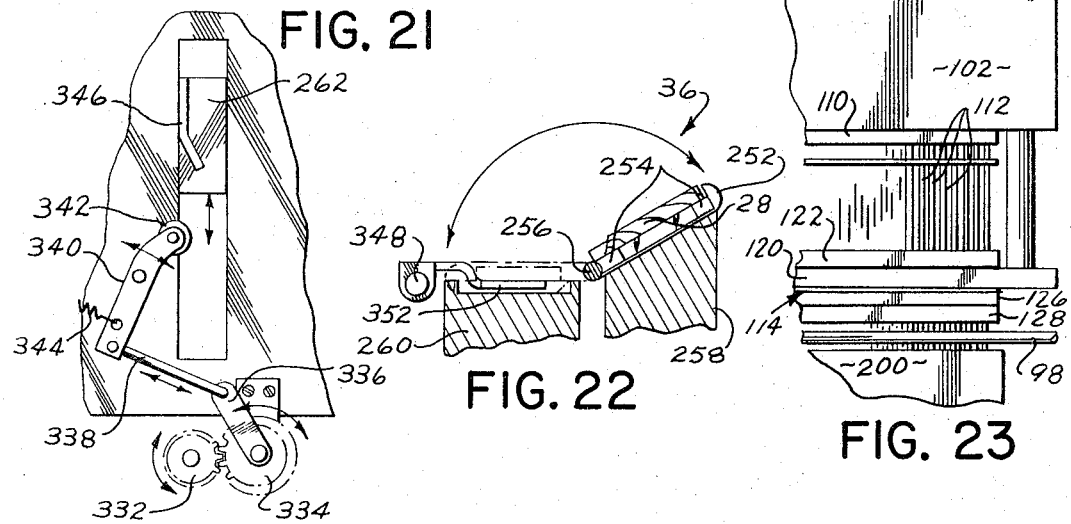
FIG. 21
FIG. 22
FIG. 23

Feb. 28, 1967 G. W. SMALL 3,306,511
MACHINE FOR PRE-NAILING AND PRE-TACKING CARPET STRIPS
Filed April 19, 1965 5 Sheets-Sheet 5
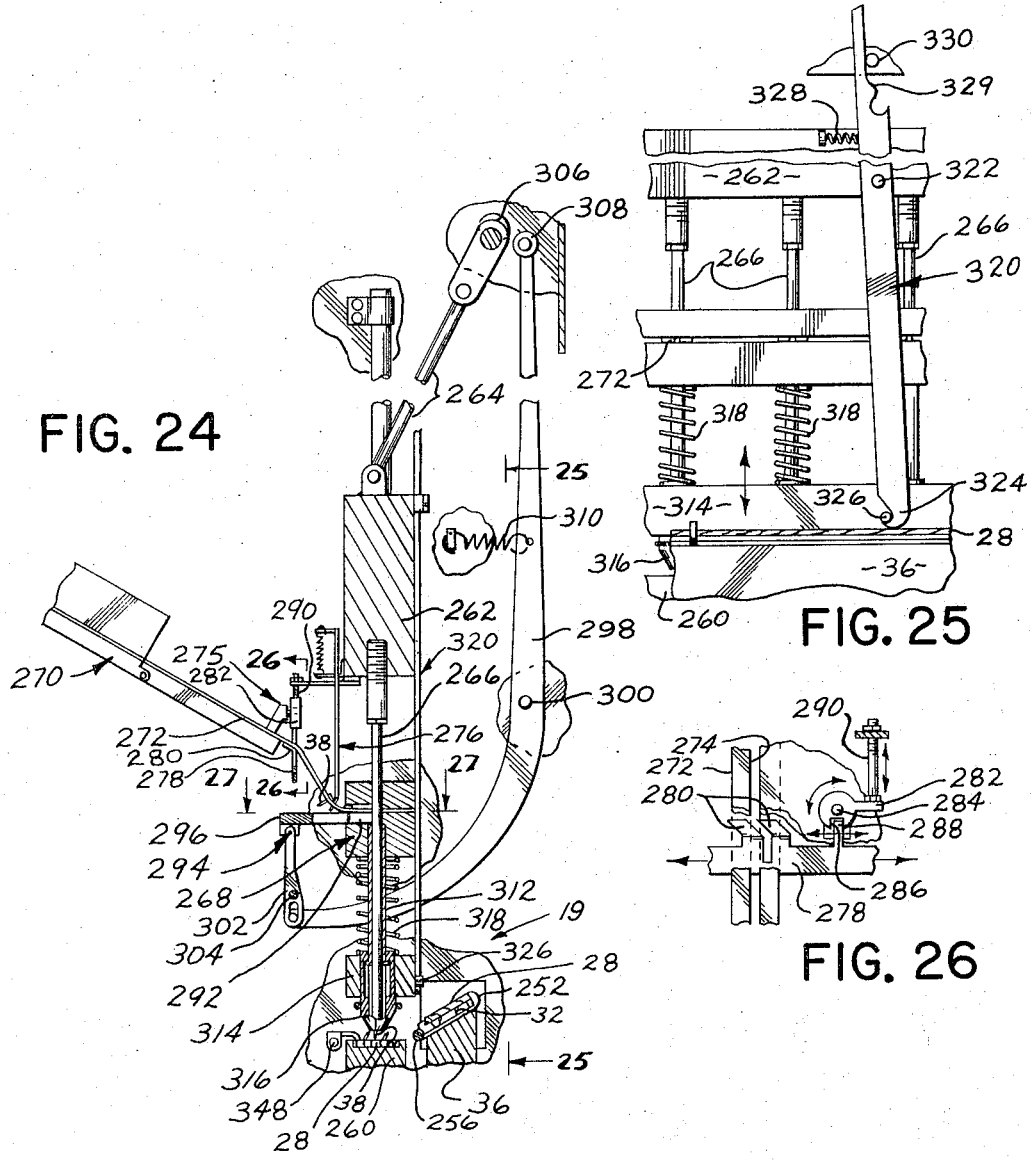
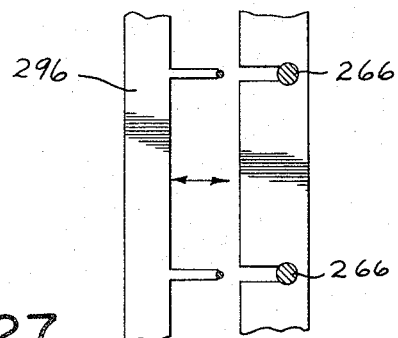

United States Patent Office 3,306,511
Patented Feb. 28, 1967

3,306,511
MACHINE FOR PRE-NAILING AND PRE-TACKING
CARPET STRIPS
Guy W. Small, 172 E. Dexter St.,
Covina, Calif. 91722
Filed Apr. 19, 1965, Ser. No. 464,256
(Filed under Rule 47(b) and 35 U.S.C. 118)
11 Claims. (Cl. 227—103)

This invention relates generally to the manufacture of carpet anchor strips employed to secure the marginal edges of wall-to-wall carpeting to floors and the like. The invention relates more particularly to a machine for inserting into carpet anchor strip nails for securing the strips to the floor and tacks for securing the strips to the carpet.

Wall-to-wall carpeting may be fastened to the floor in various ways. One of the most common methods of fastening such carpets, however, involves the use of so called anchor strips. These anchor strips consist of wooden slats or strips through which tacks are driven at an angle so as to protrude a distance above the normally upper surfaces of these strips. When installing a wall-to-wall carpet in a room, the anchor strips are first secured to the floor adjacent the walls of the room in such manner that the protruding ends of the tacks incline toward the adjacent walls. The carpet is then stretched over the floor and its marginal edges are pressed downwardly over the protruding tacks. When the carpet is laid over a wooden floor, the anchor strips are generally nailed to the floor. Carpet anchor strips intended for installation on such wooden floors are generally prenailed, that is equipped with nails whose pointed ends are driven part way through the strips so that the latter can be conveniently secured to the floor by simply driving the nails through the strips into the floor.

A general object of this invention is to provide a machine for pretacking and prenailing carpet anchor strips of the character described.

Another object of this invention is to provide a carpet anchor strip pretacking and prenailing machine of the character described which is automatic in operation.

With these and other objects in view, the invention consists in the construction, arrangement and combination of the various parts of the device, whereby the objects contemplated are attained, as hereinafter set forth, pointed out in the appended claims, and illustrated in the accompanying drawings.

In these drawings:

FIGURE 1 is a front elevation of the machine;
FIGURE 2 is an enlarged section taken on line 2—2 in FIGURE 1;
FIGURE 3 is an enlarged perspective view of the under surface of a completed carpet anchor strip from the machine;
FIGURE 4 is a view of the upper surface of the completed strip;
FIGURE 5 is a section taken on line 5—5 in FIGURE 4;
FIGURE 6 is an enlarged fragmentary view of a tack gating means embodying the machine;
FIGURE 7 is a view looking in the direction of the arrows on line 7—7 in FIGURE 6;
FIGURE 8 is an enlarged section taken on line 8—8 in FIGURE 1;
FIGURE 9 is a view looking in the direction of the arrows on line 9—9 in FIGURE 8;
FIGURE 10 is an enlarged section taken on line 10—10 in FIGURE 1;
FIGURE 11 is an enlarged view looking in the direction of the arrows on line 11—11 in FIGURE 8;
FIGURE 12 is an enlarged view looking in the direction of the arrows on line 12—12 in FIGURE 8;
FIGURE 13 is an enlarged fragmentary side elevation of a tack chute embodied in the machine;
FIGURE 14 is a view looking in the direction of the arrows on line 14—14 in FIGURE 13;
FIGURE 15 is an enlarged fragmentary view of a tack driving plunger embodied in the machine;
FIGURE 16 is an enlarged view looking in the direction of the arrows on line 16—16 in FIGURE 8;
FIGURE 17 is a fragmentary enlargement of the right hand end of the machine in FIGURE 1;
FIGURE 18 is an enlarged section taken on line 18—18 of FIGURE 17;
FIGURE 19 is an enlarged section taken on line 19—19 in FIGURE 8;
FIGURE 20 is an enlarged fragmentary plan view of a carpet strip inverter embodied in the machine;
FIGURE 21 is an enlarged section taken on line 21—21 in FIGURE 20;
FIGURE 22 is an enlarged section taken on line 22—22 in FIGURE 20;
FIGURE 23 is an enlargement of the area composed by the circular arrow 23—23 in FIGURE 1 with certain parts omitted for the sake of clarity;
FIGURE 24 is an enlarged section taken on line 24—24 in FIGURE 1;
FIGURE 25 is an enlarged section taken on line 25—25 in FIGURE 24;
FIGURE 26 is an enlarged section taken on line 26—26 in FIGURE 24; and
FIGURE 27 is an enlarged section taken on line 27-27 in FIGURE 24.

The carpet anchor strip pretacking and prenailing machine 10 illustrated in these drawings comprises a supporting frame 12 including an infeed end 14, an intermediate operating section 16, and an outfeed end 18. The operating section 16 is composed of a carpet strip inverting station 19 and two operating stations, to wit, a tacking station 20 and a nailing station 22. Reference numeral 24 designates the work level of the machine, that is the level at which carpet anchor strips advance through the machine. At the infeed end 14 of the machine frame 12 is a hopper 26 for containing a supply of wooden slats or strips 28 on which the machine operates to form completed anchor strips. These wooden strips are successively fed in the endwise direction from the hopper 26 through the inverting station 19 and the operating stations 20 and 22 to the outfeed station 18 by a horizontally reciprocating infeed conveyor mechanism 30.

Upon arrival at the tacking station 20, the endwise movement of each strip 28 is momentarily arrested and carpet tacks 32 are driven at an angle through the strip, by operation of a tack driving mechanism 34, to a position wherein the pointed ends of the tack protrude a distance above a normally upper surfaces of the strip, as shown in FIGURES 4 and 5. Upon completion of its tacking operation, each strip 28 is fed endwise to the inverting station 19 where the movement of the strip is again momentarily arrested. At this latter station, the strip is inverted and laterally translated to the nailing station 22 by operation of a strip inverter 36, after which nails 38 (FIGURE 5) for attaching the completed carpet anchor strip to the floor are driven part way through the strip by operation of a nailing mechanism 40. The strip is then ejected endwise from the outfeed end 18 of the machine as a completed carpet anchor strip.

The infeed end 14 of the machine comprises open rectangular frame structure 42 at the work level 24 and including a central work piece guide 44 which is secured to the frame structure 42 and extends lengthwise of the machine from the infeed end 14 to the tacking station 34.

The strip supply rack 26 is attached at its lower end to the work guide 44 and is anchored, by a strip 46, to the machine frame 12. The rack slopes rearwardly toward its upper end and comprises an open rectangular framework including side members, or angles, 48 which support the ends of the strips 28. At the lower ends of the side angles 48 are inwardly directed flanges 50 which define, with the rear flange of the angles 48, channels which open at their lower ends to the work guide 44. These channels receive the ends of the strips 28 which are located at the bottom of the rack 26.

The infeed conveyor mechanism 30 is powered by a motor 54 mounted on a top supporting plate 56 of the machine frame 12. This plate extends over the tacking station 20 and nailing station 22, a distance above the work level 24. Rotatably supported on the under side of the plate 56, by means of bearings 58, is a main drive shaft 60. The right hand end of this drive shaft has fixed thereon a worm wheel 62. Worm wheel 62 meshes with a worm 64 which is rotably supported at its ends in bearing 66 attached to a vertical supporting plate 68 on the machine frame, at the right hand side of the tacking station, above the work level 24. Motor 54 drives the worm 64 through a speed reducer 70 and a belt drive 72. Worm 64 mounts a fly wheel 74 for dampening speed fluctuations of the drive shaft 60. It is apparent, therefore, that the drive shaft is driven in rotation by the motor 54.

Fixed to the left hand end of the drive shaft 60 is a crank arm 76. Pivotally connected at its upper end to the outer end of the crank arm 76 is a connecting rod 78. The lower end of the connecting rod 78 is pivotally connected to a slide 80. This slide is slidably supported at one end in a vertical track 82 fixed to the machine frame 12, whereby rotation of the drive shaft 60 is effected to impart vertical reciprocating motion to the slide 80. This slide contains a horizontal slot 84.

Located to the right of the slide 80 is a bell crank 86 which is pivotally mounted on the machine frame 12, by a pivot 88, for rocking motion about a horizontal axis extending normal to the plane of the paper in FIGURE 1. Fixed to this bell crank is a cylindrical bearing pin 90 which engages in the slot 84 of the vertical reciprocating slide 80. It is apparent, therefore, that the vertical reciprocating motion of the slide 80 imparts rocking motion to the bell crank 86 about its horizontal pivot 88. One arm of the bell crank 86 extends upwardly toward the work level 24 and mounts a bearing pin 92. This bearing pin engages in a vertical slot 94 within a cross member 96 rigid on a horizontal actuating rod 98. Actuating rod 98 extends lengthwise of the machine frame 12, from its infeed end 14 to its outfeed end 18, and is slidably supported on the machine frame for axial reciprocating motion. The actuating rod is located approximately at the work level 24 of the machine. The right hand end of the actuating rod 98 extends across the infeed end 14 of the machine to a position some distance beyond the strip supply rack 26 and is located forwardly of the work guide 44. Fixed to the right hand end of the actuating rod is a conveyor member or strip infeed arm 100 which extends over the work guide 44. The free end of this arm is disposed to engage the right hand end of the lower most strip 28 in the rack 26 during the left hand infeed stroke of the rod, thereby to feed such lower strip endwise from the rack. The stroke length of the actuating rod 98 is such that during movement of the rod from the right hand limit of its stroke to the left hand limit of its stroke, the lowermost strip 28 in the rack is fed endwise along a longitudinal direction line of the frame from the rack to a tacking position at the tacking station 20 of the machine. The length of the strip feed arm 100 is such that the arm remains under the next strip in the rack during its left hand infeed stroke to retain the latter strip in the rack until the arm returns to its right hand limiting position. In this latter position, the infeed arm clears the next strip, thus permitting the latter strip to drop from the rack onto the work guide 44 in front of the arm.

The tack driving mechanism 34 at the tacking station 20 comprises a horizontal cross head 102 which is slidably supported at its end on vertical guide rods 104. The cross head 102 is located above the work level 24 and is slidably supported by the guide rods 104 for vertical reciprocating motion toward and away from the work level. Pivotally connected at their lower ends to the upper surface of the cross head 102 are a pair of connecting rods 106. The upper ends of the connecting rod 106 are pivotally connected to crank arms 108 on the drive shaft 60, whereby rotation of the drive shaft is effective to drive the cross head in its vertical reciprocating motion. Attached to the under surface of the cross head 102 are a multiplicity of tack driving plungers 112. These plungers are arranged in two rows extending lengthwise of the cross head 102 in such manner that the plungers in one row are offset relative to the plungers in the other row.

Rigidly mounted on the lower ends of the cross head guide rods 104, just above the work level 24, is a tack receiver 114 which receives carpet tacks 32 from a hopper 116 and locates the tacks in positions to be driven by the plungers 112 through the carpet anchor strip 28 currently at the tacking station 20. While the strip is situated at this latter station, it is supported from below by a tack anvil 118. Tack receiver 114 comprises a rigid bar 120 which is firmly attached at its lower ends to the lower ends of the cross head guide rods 104. Bar 120 is provided with guide bores 124 axially aligned with and slidably receiving the tack driving plungers 112, resepctively. When the cross head 102 is at the upper end of its stroke, the lower ends of the plungers are substantially flush with the under surface of the bar 120. Below the bar 120 is a plate 126 which is rigidly fixed to the bar and is slightly spaced from the latter to define therebetween a narrow gap 127. Fixed to the under surface of plate 126 is a bar 128. Plate 126 has a series of slots 130 extending laterally therethrough and opening through its rear edge. The lower bar 128 has bores 134 axially aligned with the inner forward ends of the plate slots 130. The bores 130, in turn, are axially aligned with and proportioned to slidably receive the tack driving plungers 112 during the downward tack driving stroke of the cross head 102. As will be explained presently, the carpet tacks delivered to the tack driving mechanism 34 from the hopper 116 are pushed laterally through the slots 130 in the plate 126 to the forward ends of these slots and are then driven axially downward through the bores 134 in the bar 128 by the tack driving plungers 112. At this point, therefore, it is apparent that the bar 120 of the tack receiver 114 serves as a guide for the tack driving plungers 112 and the lower bar 128 of the tack receiver serves as a receiving and positioning means for the carpet tacks to be driven by the tack driving plungers.

Fixed in the lower ends of the bores 134 in the lower tack receiving bar 128 are bushings 136 whose lower ends protrude below the under surface of the bar. These bushings have axial bores 138 which open through the ends of the bushings and are proportioned to receive the heads 32a of the carpet tacks 32 with a relatively close fit. The lower ends 112a of the tack driving plungers 112 are reduced in diameter to fit within the bushing bores 138.

The tack hopper or bin 116 is located to the rear of the tack driver cross head 102 and is rotatably supported, at its other side, on a horizontal shaft 140 attached to and extending lengthwise of the machine frame 12. The hopper 116 is then adapted for rocking motion about the horizontal axis of the shaft 140. Mounted on the machine frame 12, below the work level 24 at approximately mid-way between the tacking station 20 and the nailing station 22, is a motor 142 for rocking the hopper. To the rear of the motor 142 is a shaft 144 which extends parallel to the shaft 140 and is rotatably supported in bearings 146 fixed to the machine frame. Shaft 144 is driven from the motor 142 through a belt drive 148. Rigid on the right hand end of the shaft 144 is a crank arm 150. Pivotally connected at its lower end to the outer end of the crank arm 150 is a connecting rod 152, the upper end of which is pivotally connected to the under side of the tack bin 116. Rotation of the shaft 144 by the motor 142, therefore, is effective to oscillate the tack bin 116 about its supporting shaft 140. This oscillation of the tack bin serves to agitate the tacks in the bin and thereby facilitate their movement from the bin to the tack receiver 114, in the manner described below.

Extending from the tack bin 116 to the tack receiver 114 is a tack chute 154. This tack chute comprises a plurality of spaced supporting bars 156 which define therebetween slots 158 through which the carpet tacks 32 move from the tack bin to the tack receiver. The slots 158 are just slightly wider than the shanks of the carpet tacks 32, whereby the bars 156 slidably support the heads of the carpet tacks.

During operation of the machine, oscillation of the tack bin 116 by the motor 142 periodically rotates the bin to a position wherein the tacks slide by gravity from the bin into the guide slots 158 of the tack chute 154. The tacks then slide by gravity downwardly along the chute to the tack receiver 114. The lower end of the chute is secured to the upper surface of the tack receiver plate 126 and the guide slots 158 in the chute are aligned with the slots 130 in the plate, whereby the tacks slide by gravity from the chute into the receiver slots 130, in such manner that the tack heads 32a enter the gap 127 in the receiver. The tack chute is flexible to permit oscillation of the tack bin, as described above.

Indicated at 168 is a conventional gating means for controlling movement of the tacks from the tack chute 154 into the tack receiver 114. This gating means comprises a gating bar 170 which extends across the other side of the lower end of the tack chute 154 and mounts projecting tack gating fingers 172 which pass tacks, one at a time through each chute slot 158, in response to longitudinal reciprocation of the gating bar. This bar is reciprocated in timed relation to vertical reciprocation of the cross head 102 by a bell crank 174, which is rocked in one direction by the descending cross head and returned in the opposite direction by a spring 176. The bell crank is connected to the gating bar 170, as shown in FIGURE 6, whereby oscillation of the bell crank by the cross head and spring imparts reciprocating motion to the tack gating bar.

Numeral 180 in FIGURE 16 designates a tack pushing mechanism which operates on the tacks 32 as they emerge from the tack chute 154 to push the tacks forwardly through the tack receiver slots 130. This tack pushing mechanism comprises a horizontal pusher plate 182 at the rear of and parallel to the tack receiver. Projecting from the forward edge of this pusher plate are a number of fingers 184 aligned with and adapted to enter the receiver slots 130 upon forward movement of the pusher plate. As the pusher plate 182 travels forwardly, the advancing pusher fingers 184 engage the tacks currently in the receiver slots 130 and push these tacks forwardly to the forward ends of the slots. Pivotally connected to both ends of the plate 182 are bell cranks 185 and 185' (only one shown) which are also pivotally connected to the lower ends of levers 186 (only one shown). These levers are pivoted intermediately on the machine frame 12, whereby oscillation of the levers is effective to reciprocate the pusher plate 182. On the upper end of these levers are rollers 188 and 188' which are disposed in the path of rotation of cams 190 and 190' on the main drive shaft 60. Springs 192 (only one shown) urge the upper ends of the levers toward the cam. It is apparent, therefore, that during rotation of the drive shaft 60, the cams 190 and 190' and springs 192 and 192' cooperate to oscillate the levers 186 and 186' and thereby reciprocate the tack pusher plate 182, in timed relation to the vertical movement of the tack driver crosshead 102.

Movably mounted on the crosshead 102 is a secondary tack gating plate 194 which is urged downwardly by a spring 196 connected between the gating plate and the crosshead. When the crosshead descends, the gating plate is resiliently pressed against the tack chute 154 just below the primary tack gating bar 170 and fingers 197 along the lower edge of the gating plate engage in the tack chute slots 158 to prevent movement of the tacks passed by the primary gating bar to the tack receiver. When the crosshead rises, the gating plate 194 is elevated out of contact with the tack chute to permit the tacks to move to the tack receiver. The operation of the tack gating means 168 is so timed that tacks are passed through the latter means after the cross head is descended sufficiently to engage the gating plate 194 with the tack chute. During the subsequent upward return stroke of the cross head, the gating plate 194 rises to pass these tacks to the tack receiver.

At this point, it is apparent that the tacks in the tack bin 116 move under the action of gravity from the bin into the upper ends of the guide slots 158 in the tack chute 154 in response to upward rotation of the tack bin. The tacks then slide downwardly through the guide slots to the tack gate 168. This tack gate and the tack gating plate 194 cooperate to pass the tacks from the chute to the tack receiver 114 in timed relation to vertical reciprocating motion of the tack driver cross head 102. The tack pushing mechanism 180, which is also operated in timed relation to the vertical motion of the cross head 102, is effective to advance the entering tacks to the forward end of the receiver grooves 130 while the cross head is ascending and subsequently descending. The tacks then drop into the receiver bushings 136 under the action of gravity. Immediately thereafter, the descending tack driving plungers 112 drive the tacks downwardly through the bushings into an anchor strip 28 currently positioned on the underlying tack anvil 118.

Tack anvil 118 comprises a pair of vertical side plates 198 and 200 which are rigidly mounted on the machine frame 12, directly below the tack receiver 114. The upper edge surfaces of the anvil plates 198, 200 are disposed in the plane of the upper work supporting surface of the infeed work guide 44 and form, in effect, an extension of this work guide, whereby the anchor strips 28 may slide, without interference, from the work guide onto the anvil plates. Anvil plate 198 has an upstanding retaining shoulder 202 which engages one longitudinal edge of the anchor strip 28 currently supported on the anvil 118 to laterally position the strip on the anvil. It will be recalled that the anchor strips are successively fed from the supply rack 26 to the tacking station 20 by the actuating bar or rod 98. The crank arm 76 on the main draft shaft 60, which reciprocates the actuating rod 98, is so angularly oriented relative to the cranks 108, which reciprocate the tack driver cross head 102, that the actuating rod is driven to the left in FIGURE 1 to advance an anchor strip 28 from the rack 26 to the tacking station 20 while the cross head is proceeding through the upper portion of its stroke. The stroke length of the actuating rod is such that each anchor strip is advanced to an operative position at the tacking station wherein the strip is centered endwise below the tack receiver 114. The actuating rod is then retracted to the infeed end of its stroke in preparation for the next down stroke of the cross head, during which the tacks 32 currently held in the tack receiver 114 are driven downwardly by the tack driving plungers 112 through the anchor strip 28 now supported on the tack anvil 118. Because of the fact that the anvil supports the anchor strip in an inclined position, the tacks 32 are driven through the strip at an angle, as shown in FIGURE 5.

It is apparent that the anvil plates 198, 200 are effective to support only the longitudinal side edges of each anchor strip. In order to prevent splitting of the strips during the tacking operation, it is necessary to support the central portion of each anchor strip between the anvil plates. To this end, there is positioned between the anvil plates a vertically movable anvil bar 204. This anvil bar is vertically movable between an upper extended position, shown in FIGURE 8, wherein the upper surface of the bar supports, in the region between the anvil plates, the anchor strip currently positioned on the anvil, and the lower retracted position, wherein the upper surface of the anvil bar is spaced from the under surface of the anchor strip. To this end, the upper surface of the anvil bar slopes at the same angle as the upper edge surfaces of the anvil plates 198, 200, as shown.

Anvil bar 204 is vertically reciprocated between its upper extended and lower retracted positions by rotary eccentrics 208 which are located between the anvil side plates 198, 200, and are rotatably supported by bearings 210 in the latter plates. These eccentrics engage in longitudinal slots in the anvil bar, whereby rotation of the eccentrics is effective to vertically reciprocate the anvil bar between its extended and retracted positions. The anvil bar is restrained against endwise movement, during such vertical reciprocation thereof, by any convenient means (not shown).

Fixed on the forward end of each eccentric shaft 212 is a pinion 214. Each pinion 214 meshes with a gear 216 rotatably mounted on the forward side of the forward anvil plate 200. The several eccentric gears 216 are operatively connected by an actuating link 218 which is pivotally connected to an arm fixed to each gear, as shown in FIGURE 11. Endwise reciprocation of the link 218, therefore, is effective to simultaneously oscillate the several anvil bar eccentrics 208. Link 218 is reciprocated by operation of a cam mechanism 220 (FIGURE 10) including a cam 222 fixed to the main drive shaft 60. Above and below the cam 222 are cam follower arms 224 and 226 disposed in planes normal to the shaft 60. The rear ends of the arms 224, 226 are pivotally attached to the machine frame 12. The forward ends of the arms are pivotally attached to the upper end of a connecting rod 228. The lower end of this connecting rod is pivotally attached to one arm of a bell crank 230 which is pivoted on the shaft 212 of the adjacent anvil pinion 214 and has its other arm pivotally attached to the adjacent end of the link 218. From this description, it is apparent that the cam mechanism 220 constitutes a double acting cam mechanism which is effective to oscillate the anvil eccentrics 208, and thereby vertically reciprocate the movable anvil bar 204 between its upper extended and lower retracted positions in timed relation to rotation of the drive shaft 60.

Extending into the upper surface of the anvil bar 204 are bores 234. These bores are aligned with the tack driving plungers 112, respectively, and receive the lower ends of the tacks 32 when the latter are driven through an anchor strip 28 positioned on the anvil 18. Cam 222 which effectively vertically reciprocates the anvil bar 204 is so shaped and angularly oriented on the drive shaft 60 that the anvil bar is retained in its upper limiting position of FIGURE 8, to support the central portion of an anchor strip 28 positioned on the anvil, during driving of the tacks 32 through the strip. During the subsequent up-stroke of the tack driving cross head 102, the anvil bar is retracted downwardly to clear the protruding tacks in the anchor strip and thereby permit endwise movement of the strip from the tacking station 20 to the nailing station 22.

Slidably mounted on the upper surface of the rear anvil plate 198 is a hold down plate 236 which is laterally movable between a forward extended position shown in FIGURE 8, wherein the forward edge of the plate overlies an anchor strip 28 currently positioned on the tack anvil 118, and the rear retracted position, wherein the forward edge of the hold down plate clears the anchor strip. The forward edge of this hold down plate is notched, in the manner shown in FIGURE 12, to clear the tack driving plungers. Plate 236 is laterally reciprocated in timed relation to the vertical movement of the tack driving cross head 102 by means 238 including a cam 240 on the drive shaft 60, a double acting cam follower means 242 engaging the cam, a link 244 pivotally connected at its upper end to the cam follower means 242, an oscillatory linkage 246 operatively connected to the lower end of the link 244, and an actuating rod 248 which is operatively connected to the hold down plate 236 in the manner illustrated in FIGURE 12 and to the oscillatory linkage 246 in the manner illustrated in FIGURE 8, whereby endwise reciprocation of the connecting link 244 by the cam 240 laterally reciprocates the hold down plate.

During each up-stroke of the tack driving cross head 102, a new anchor strip enters the tack driving station 20 from the infeed end of the machine. The anchor strip currently at the tacking station is fed endwise from the latter station, by the entering strip, to the strip inverting mechanism 36 at the inverting station 19. This strip inverting means comprises a strip inverting bar 252 which receives the strip entering from the tacking station and has spaced supporting surfaces 254 for supporting the entering strip along its longitudinal edges, in the manner illustrated in FIGURE 22. The inverting bar 252 is hinged at 256 for rotation, about a longitudinal axis of the frame, between its normal solid line position of FIGURE 22, wherein the inverting bar rests on a supporting bar 258 at the inverting station and is disposed to receive the anchor strip entering the inverting station from the tacking station, and its inverted position illustrated in phantom lines in that figure, wherein the inverting bar overlies a nailing anvil 260 at the nailing station. During rotation of the inverting bar from its normal position to its inverted position, an anchor strip 28 supported in the bar is turned over and deposited on the upper surface of the nailing anvil 260, as illustrated in phantom lines in FIGURE 22. The nailing mechanism 40 of the machine then becomes operative to drive the nails 38 through the strip. This nailing mechanism is essentially identical to the tack driving mechanism at the tacking station and, therefore, will not be described in detail. Suffice it to say, that the nailing mechanism comprises a cross head 262 which is supported for vertical movement on the machine frame and is driven in such vertical movement from the main drive shaft 60 through cranks 264. Cross head 262 mounts nail driving plungers 266. Below the cross head 262 is a nail receiver 268 which is similar to the tack receiver at the tacking station mounted on the machine frame. This nail receiver is supplied with nails from a nail bin 270 which is oscillated in unison with the tack bin 116. The nails move from the nail bin to the nail receiver through a nail chute 272 having slots 274 through which the nails travel. Movement of the nails through the chute to the nail receiver is controlled by a primary nail gate 275 and a secondary nail gate 276. The secondary nail gate 276 is identical to the nail gate 194, 196 at the tacking station and is mounted on the nail driving cross head 262 so as to be operated in unison with the vertical movement of the latter cross head, in much the same way as the tack gate 194, 196. Accordingly, no further description of the nail gate 276 is necessary. The primary nail gate 275 comprises a nail gating bar 278 which extends across the under side of the lower end of the nail chute 272 and is provided with nail gating fingers 280 which pass nails, one at a time, through each of the nail slots 274 in the nail chute 272 in response to endwise reciprocation of the gating bar. This gating bar is reciprocated in timed relation to the vertical movement of the cross head 262 by a bell crank 282 which is pivotally supported at 284 on the nail chute 272 and has a slot 286 receiving the projecting finger 288 on the gating bar 278. Mounted on the cross head 262 is a set screw 290 which engages one arm of the bell crank 282 during downward movement of the cross head, thereby to drive the gating bar 278 in one direction. The gating bar is returned in the opposite direction, during the up-stroke of the cross head 262, by a spring (not shown). The nails which enter the nail receiver 268 from the nail chute 272 are pushed forwardly in the nail receiver grooves 292 by a pusher mechanism 294 including a pusher plate 296 like the tack pusher plate 182 at the tacking station. This nail pusher plate is reciprocated back and forth into and from the nail receiver grooves 292, thereby to feed the nails entering the receiver to the forward ends of these grooves, by a bell crank 298 which is pivoted at 300 on the machine frame and is operatively connected, at its lower end, to the pusher plate through a lever 302 which is pivoted at 304 on the machine frame, whereby rocking of the bell crank 298 reciprocates the pusher plate. Bell crank 298 is oscillated to thus reciprocate the pusher plate by means of a cam 306 on the drive shaft 60 and a roller 308 on the upper end of the bell crank engageable by the cam. A spring 310 urges the upper end of the bell crank toward its rocking cam 306.

Depending below the nail receiver 268, in coaxial alignment with the nail driving plungers 266, respectively, are sleeves 312. The upper ends of these sleeves are fixed in the nail receiver. Slidable on the lower ends of the sleeves 312 is a bar 314 mounting, at its under side, spring contracted collets 316. Collets 316 are aligned with the sleeves 312, respectively. During operation of the machine, nails drop from the nail receiver 268 through the sleeves 312 into the collets 316 which are normally contracted sufficiently to prevent the nails from passing through the collets. Thereafter, the nail driving plungers 266 descend to drive these nails downwardly through the collets into an anchor strip 28 supported on the underlying nailing anvil 260.

Acting between the nail receiver 268 and the collet bar 314 are springs 318 which urge the collet bar downwardly to its lower limiting position of FIGURE 24, wherein the lower ends of the collets 316 are located just above the nailing anvil 260. This downward movement of the collet bar is limited by the illustrated coacting shoulders on the collet bar and the sleeves 312. As will be explained shortly, during each up-stroke of the nail driving cross head 262, the anchor strip inverting bar 252 is rotated from its solid line position to its phantom line position of FIGURE 22, thereby to deposit each anchor strip arriving at the nailing station in an inverted position on the nailing anvil 260. Accordingly, during each up-stroke of the nailing cross head 262, it is necessary to retract the collet bar 314 upwardly out of the path followed by the inverting bar during its rotation from its solid line position to its phantom line position of FIGURE 22. To this end, levers 320 are pivotally mounted at 322, intermediate their ends, on the nailing cross head 262. Levers 320 have hooks 324 at their lower ends for engagement with pins 326 on the collet bar 314. Levers 320 are resiliently biased by springs 328 on the cross head 262 in such manner that when the cross head descends to its lower limiting position, the lower hooks 324 on the levers ride past and then snap into engagement with the pins 326 on the collet bar 314. Accordingly, the collet bar is retracted upwardly away from the nailing anvil 260 during the upstroke of the cross head 262. On the upper end of each collet bar retracting lever 320 is a cam surface 329. During the up-stroke of the cross head 262, these cam surfaces are engaged by pins 330 on the machine frame above the cross head, which pins cam the lever hooks 324 out of engagement with the collet bar pins 326, thereby releasing the collet bar for return to its lower limiting position under the action of the collet bar springs 318.

The anchor strip inverting bar 252 is rotated from its solid line position of FIGURE 22 to its phantom line position to deposit an anchor strip 28 in an inverted position on the nailing anvil 260 during this upward retraction of the collet bar 314. To this end, a pinion 332 (FIGURE 21) is secured to the anchor strip inverting bar 252 concentric with its hinging axis. Pinion 332 meshes with a gear 334 rotatably mounted on the machine frame. Fixed to the gear 334 is an arm 336. A link 338 is pivotally attached at one end to the outer end of the arm 336. The opposite end of the link 338 is pivotally attached to one end of the lever 340 which is pivotally mounted intermediate its ends on the machine frame. The opposite end of the arm carries a roller 342. Connected between the lever 340 and the machine frame is a spring 344 which normally urges the lever to its position of FIGURE 21, wherein the roller 342 is disposed in the path of movement of a cam 346 mounted on the nail driving cross head 262. When the cross head descends, this cam engages the roller 342 to rotate the lever 340 against the action of the spring 344. Thus, the lever 340 is rocked in one direction on its pivot axis during the down stroke of the cross head 262 and in the opposite direction during the up-stroke of the cross head. This rocking of the lever, in turn, oscillates the pinion 332, thereby to rotate the anchor strip inverting bar 252 between its solid line retracted position of FIGURE 22 and its phantom line extended position of that figure. These movements of the various parts illustrated in FIGURES 21 and 22 are so timed that the inverting bar 252 is rotated from its retracted to its extended position and then back to its retracted position during the interval that the collet bar 314 is retracted upwardly to clear the inverting bar, in the manner heretofore explained.

Extending parallel to the anchor strip infeed conveyor rod 98 which is reciprocated, in the manner explained earlier, to feed the anchor strips 28 from the storage rack 26 to the tacking station 20, is a second anchor strip conveyor means or rod 348 which is slidably supported in bearings (not shown). The end of this rod at the right hand end of the machine is attached to the adjacent end of the rod 98 by means of a bracket 350, whereby the rod 348 is reciprocated with the rod 98. Fixed to the left hand end of this rod is a second conveyor member or feed arm 352 which overlies the nailing anvil 260. During the left hand stroke of the rods 98, 348, this feed arm engages the anchor strip 28 currently supported on the nailing anvil 260 to feed the latter strip endwise from the nailing station 22 to the outfeed end of the machine.

During operation of the machine, the anchor strips 28 contained in the storage rack 26 are successively fed endwise from the storage rack to the tacking station 20. At this station, the tacks 32 are driven through the anchor strip. The anchor strip is then fed endwise, by the following anchor strip, from the tacking station to the nailing station 22. At this latter station, the anchor strip is inverted and the nails 38 are driven part way through the anchor strip. A completed anchor strip is then ejected endwise from the machine.

It is evident at this point that the work guide 44, the tacking anvil 118, and the anchor strip inverting bar 252, when the latter occupies its solid line position of FIGURE 22, together constitute, in effect, first work supporting and guiding means on the frame 12 for supporting and guiding the anchor strips 28 for endwise movement along a first longitudinal direction line of the frame from the infeed end of the frame, through the tacking station 20, to the inverting station 19. The nailing anvil 260 constitutes, in effect, a second work supporting and guiding means for supporting and guiding the anchor strips for endwise movement along a second longitudinal direction line of the frame, parallel to the first direction line, through the nailing station 22 to the outfeed end of the frame. The pivot axis of the anchor strip inverting bar 252 extends parallel to and is located between these direction lines, whereby the bar is effective to simultaneously rotate and laterally translate each anchor strip arriving at the inverting station 19 to an inverted position on the work supporting means or nailing anvil 260.

While the invention has herein been shown and described in what is conceived to be its most practical and preferred embodiment, it is recognized that departures may be made therefrom within the scope of the invention, which is not to be limited to the details disclosed herein but is to be accorded the full scope of the claims so as to embrace any and all equivalent devices.

Having described the invention what is claimed is new in support of Letters Patent is:

1. A machine for tacking and nailing carpet anchor strips comprising: an elongate supporting frame having infeed and outfeed ends, first work supporting and guiding means extending lengthwise of said frame from said infeed end toward said outfeed end for supporting and guiding said anchor strips for endwise movement along a first longitudinal direction line of said frame, said frame having a first operating station and a following inverting station spaced along said direction line, second work supporting and guiding means laterally offset from said first work supporting means and extending lengthwise of said frame from said inverting station to said outfeed end for supporting and guiding said anchor strips for endwise movement along a second longitudinal direction line of said frame parallel to and laterally offset from said first direction line, said frame having a second operating station along said second direction line, first conveyor means on said frame for feeding said anchor strip endwise along said first work supporting means in successive end to end relation from said infeed end to said inverting station in such manner that each strip is momentarily arrested at said first operating end inverting stations, second conveyor means on said frame for feeding said anchor strips endwise along said second work supporting means in successive end to end relation from said inverting station to said outfeed end in such manner that each strip is momentarily arrested at said second operating station, tack driving means on said frame at one of said operating stations operable when each strip is stationary at said one operating station for driving tacks through the respective strip from one side thereof to positions wherein said tacks protrude beyond the opposite side of the strip at an angle to the plane of the strip, nail driving means on said frame at the other operating station operable while each anchor strip is stationary at said other operating station for driving nails part way through the respective strip from said opposite side thereof, inverting means on said frame at said inverting station for receiving each anchor strip endwise from said first operating station and thereafter simultaneously rotating and laterally translating the respective anchor strip to an inverted position on said second work supporting means, said work supporting means including fixed longitudinal shoulder means for supporting each anchor strip against lateral movement while said tacks and nails are being driven through the respective strip, and operating means for driving said conveyor means, tack driving means, nail driving means, and inverting means in timed relation.

2. A machine according to claim 1 wherein: said tack driving means are located over the said first work supporting means at said first operating station and are effective to drive said tacks into the upper side of each anchor strip to positions wherein said tacks protrude below the under side of the respective strip, said inverting means comprise an elongate anchor strip inverting bar extending lengthwise of said frame and pivotally mounted on said frame on an axis parallel to and located between said direction lines for swinging movement between a first position, wherein said bar is longitudinally aligned with and effectively forms one section of said first work supporting means and said bar is disposed to receive each anchor strip in the endwise direction from said first operating station, and a second position, wherein said bar is disposed in an inverted position over said second work supporting means, said bar including longitudinally extending laterally spaced shoulder surfaces disposed for supporting engagement with the under side of each anchor strip along the longitudinal edges thereof and outboard of the protruding ends of the tacks in the respective strip whereby said bar is effective to transport each anchor strip from said first work supporting means to an inverted position on said second work supporting means, and said nail driving means are located at said second operating station over said second work supporting means and are effective to drive said nails into the side of each anchor strip which is uppermost in said inverted position of the respective strip.

3. A machine according to claim 1 wherein: said tack driving means comprise vertically reciprocating tack driving plungers on said frame, said nail driving means comprise vertically reciprocating nail driving plungers on said frame, the work supporting means opposite said tack driving means include anchor strip supporting surfaces disposed in a plane inclined at an acute angle to the vertical direction of movement of said tack driving plungers, whereby said tacks are driven through each anchor strip at an angle to the plane of the strip, and the work supporting means opposite said nail driving means comprise anchor strip supporting surfaces disposed in a plane substantially normal to the vertical direction of movement of said nail driving plungers, whereby said nails are driven through each anchor strip substantially normal to the plane of the strip.

4. A machine according to claim 1 wherein: said tack driving means comprise tack driving plungers mounted on said frame over said first work supporting means at said first operating station for vertical reciprocating movement toward and away from said first work supporting means, said first work supporting means comprise upwardly presented anchor strip supporting surfaces disposed in a plane inclined at an acute angle to the vertical direction of movement of said tack driving plungers, whereby said tacks are driven through each anchor strip at an acute angle to the plane of the respective strip to positions wherein said tacks protrude below the under side of the strip, said inverting means comprise an elongate anchor strip inverting bar extending lengthwise of said frame and pivotally mounted on said frame on an axis parallel to and located between said direction lines for swinging movement between a first position, wherein said bar is longitudinally aligned with and effectively forms one section of said first work supporting means and said bar is disposed to receive each anchor strip in the endwise direction from said first operating station, and a second position, wherein said bar is disposed in an inverted position over said second work supporting means whereby said anchor strip inverting bar is effective to transport each anchor strip from said first work supporting means to an inverted position on said second work supporting means, said nail driving means comprise nail driving plungers mounted on said frame over said second work supporting means at said second operating station, and said second work supporting means comprise upwardly presented anchor strip supporting surfaces disposed in a plane substantially normal to the vertical direction of movement of said nail driving plungers, whereby said nails are driven through each anchor strip substantially normal to the plane of the respective strip.

5. A machine according to claim 1 wherein: said first conveyor means comprise a first conveyor member engageable with one end of each anchor strip and movable endwise of said first work supporting means for feeding the respective strip endwise along said first work supporting means from said infeed end to said first operating station, said second conveyor means comprise a second conveyor member engageable with one end of each anchor strip and movable endwise of said second work supporting means for feeding the respective strip endwise along said second work supporting means through said second operating station to said outfeed end, and said operating means drive said conveyor means in such manner that said first conveyor member is retracted to said infeed end to receive the next anchor strip during operation of the driving means at said first operating station on the previous anchor strip currently at said first operating station.

6. A machine according to claim 1 wherein: said tack driving means comprise tack driving plungers mounted on said frame over said first work supporting means at said first operating station for vertical reciprocating movement toward and away from said first work supporting means, said first work supporting means comprise upwardly presented anchor strip supporting surfaces disposed in a plane inclined at an acute angle to the vertical direction of movement of said tack driving plungers whereby said tacks are driven into the upper side of each anchor strip at an acute angle to the plane of the respective strip to positions wherein said tacks protrude below the under side of the strip, said inverting means comprise an elongate anchor strip inverting bar extending lengthwise of said frame and pivotally mounted on said frame on an axis parallel to and located between said direction lines for swinging movement between a first position, wherein said bar is longitudinally aligned with and effectively forms one section of said first work supporting means and said bar is disposed to receive each anchor strip in the endwise direction from said first operating station, said anchor strip inverting bar including longitudinally extending laterally spaced shoulder surfaces disposed for supporting engagement with the under side of each anchor strip along the longitudinal edges thereof laterally outboard of the protruding ends of the tacks in the respective strip whereby said bar is effective to transport each anchor strip to an inverted position on said second work supporting means, said nail driving means comprise nail driving plungers mounted on said frame over said second work supporting means at said second operating station for vertical reciprocating movement toward and away from said second work supporting means, said second work supporting means comprise upwardly presented anchor strip supporting surfaces disposed in a plane substantially normal to the vertical direction of movement of said nail driving plungers whereby said nails are driven through each anchor strip substantially normal to the plane of the respective strip, said first conveyor means comprise a conveyor member engageable with one end of each anchor strip and movable endwise of said first work supporting means for feeding the respective anchor strip endwise along said first work supporting means from said infeed end to said first operating station, said second conveyor means comprise a second conveyor member engageable with one end of each anchor strip and movable endwise of said second work supporting means for feeding the respective anchor strip endwise along said second work supporting means through said second operating station to said outfeed end, and said operating means drive said conveyor means in such manner that said first conveyor member is retracted to said infeed end to receive the next anchor strip during operation of said tack driving means on the previous anchor strip currently at said first operating station.

7. A machine according to claim 1 wherein: said tack driving means comprise tack driving plungers mounted on said frame over the adjacent work supporting means for vertical reciprocation toward and away from said adjacent work supporting means, said nail driving means comprise nail driving plungers mounted on said frame at the other operating station over the adjacent work supporting means for vertical reciprocation toward and away from the latter work supporting means, and said operating means comprise a rotary drive shaft extending lengthwise of said frame over said plungers and means operatively connecting said shaft and plungers for effecting reciprocation of said plungers in response to rotation of said shaft.

8. A machine for tacking and nailing carpet anchor strips comprising: an elongate supporting frame having infeed and outfeed ends, first work supporting and guiding means extending lengthwise of said frame from said infeed end toward said outfeed end for supporting and guiding said anchor strips for endwise movement along a first longitudinal direction line of said frame, said frame having a tacking station and a following inverting station spaced along said direction line, second work supporting and guiding means laterally offset from said first work supporting means and extending lengthwise of said frame from said inverting station to said outfeed end for supporting and guiding said anchor strips for endwise movement along a second longitudinal direction line of said frame parallel to and laterally offset from said first direction line, said frame having a nailing station along said second direction line, first conveyor means on said frame for feeding said anchor strips endwise along said first work supporting means in successive end to end relation from said infeed end to said inverting station in such manner that each strip is momentarily arrested at said tacking and inverting stations, said conveyor means including a first reciprocating conveyor member engageable with one end of each anchor strip and movable endwise of said first work supporting means for feeding the respective anchor strip endwise along said first work supporting means from said infeed end to said tacking station, second conveyor means on said frame for feeding said anchor strips endwise along said second work supporting means in successive end to end relation from said inverting station to said outfeed end in such manner that each strip is momentarily arrested at said nailing station, said second conveyor means comprising a second reciprocating conveyor member engageable with one end of each anchor strip and movable endwise of said second work engaging means for feeding the respective anchor strip endwise along said second work engaging means through said nailing station to said outfeed end, a tack driver at said tacking station over said first work supporting means including a cross head mounted on said frame for vertical reciprocation toward and away from said first work supporting means and tack driving plungers depending below said cross head, a tack receiver mounted on said frame below said plungers for releasably holding tacks in positions to be driven downwardly by said plungers into an underlying anchor strip currently stationary at said tacking station during each downward stroke of said plungers, said plungers being effective to drive said tacks through the underlying anchor strip to positions wherein said tacks protrude below the under side of the strip, a nail driver at said nailing station over said second work supporting means including a cross head mounted on said frame for vertical reciprocation toward and away from said second work supporting means and nail driving plungers depending below said cross head, a nail receiver mounted on said frame below said nail driving plungers for releasably holding nails in positions to be driven downwardly by said nail driving plungers into an underlying anchor strip currently at said nailing station during each downward stroke of said nail driving plungers, and means for supplying nails to said nail receiver, said first work supporting means including upwardly presented anchor strip supporting surfaces disposed in a plane inclined at an acute angle to the vertical direction of movement of said tack driving plungers, whereby said tacks are driven through each anchor strip at an acute angle to the plane of the respective strip, said second work supporting means including upwardly presented anchor strip supporting surfaces disposed in a plane substantially normal to the vertical direction of movement of said nail driving plungers, whereby said nails are driven into each anchor strip substantially normal to the plane of the respective strip, an elongate anchor strip inverting bar extending lengthwise of said frame at said inverting station and pivotally mounted on said frame on an axis parallel to and located between said direction lines for swinging movement between a first position, wherein said bar is longitudinally aligned with and effectively forms a section of said first work supporting means and said bar is disposed to receive each anchor strip in the endwise direction from said tacking station, and a second position, wherein said bar is disposed in an inverted position over said second work supporting means, said anchor strip inverting bar including longitudinally extending laterally spaced shoulder surfaces disposed for supporting engagement with the underside of each anchor strip along the longitudinal edges of the strip and outboard of the protruding ends of the tacks in the strip whereby rotation of said anchor strip inverting bar from said first position to said second position is effective to simultaneously rotate and laterally translate an anchor strip on said bar from said first work supporting means to an inverted position on said second work supporting means, and operating means for driving said conveyor means, rotating said shaft, and oscillating said anchor strip inverting bar in timed relation.

9. In a machine for tacking carpet anchor strips, the combination comprising: a frame, work supporting means on said frame for supporting each anchor strip in a tacking position, a cross head mounted on said frame over said work supporting means for vertical reciprocation toward and away from said work supporting means, tack driving plungers depending from the under side of said cross head, means for vertically reciprocating said cross head, a tack receiver mounted on said frame below said plungers for releasably holding tacks in positions to be driven downwardly by said plungers through an underlying anchor strip currently positioned on said supporting means during each downward stroke of said plungers, said plungers being effective to drive said tacks through the underlying anchor strip to positions wherein said tacks protrude below the under side of the respective strip, and said work supporting means including a pair of spaced anchor strip supporting surfaces disposed for supporting engagement with the underside of each anchor strip along the longitudinal edges of the strip, a tacking anvil mounted between said surfaces for vertical movement between an upper extended position, wherein said anvil is disposed for supporting engagement with the underside of an overlying anchor strip currently positioned on said supporting means, and a lower retracted position, said anvil having openings to receive the protruding ends of the tacks in the overlying anchor strip, and means for driving said anvil between its extended and retracted positions in timed relation to vertical reciprocation of said plungers in such manner that said anvil is extended into supporting engagement with the overlying anchor strip simultaneously with downward movement of said plungers to drive said tacks through the respective strip and said anvil is retracted to release the overlying anchor strip for endwise movement from said tacking position simultaneously with upward movement of said plungers.

10. The combination according to claim 9 including: conveyor means for feeding said anchor strips endwise in successive end to end relation through said tacking position in timed relation to the vertical movement of said plungers and said tacking anvil in such manner that each strip is momentarily arrested in said tacking position during a downward stroke of said plungers to drive tacks through the respective strip.

11. In a machine for driving fasteners, such as nails and tacks, through a carpet anchor strip, the combination comprising: a frame, work supporting means on said frame for supporting each anchor strip in a position to receive said fasteners, a cross head mounted on said frame over said work supporting means for vertical reciprocation toward and away from said supporting means, fastener driving plungers depending from the underside of said cross head, a fastener receiver mounted on said frame below said plungers, said receiver having openings coaxially aligned with said plungers, respectively, for releasably holding fasteners in positions to be driven downwardly by said plungers through an underlying anchor strip current positioned on said supporting means and slots extending laterally from said openings, respectively, through one side of said receiver, means for supplying fasteners to said slots, respectively, a pusher plate adjacent said one side of said receiver including projecting fingers extending into said slots, means mounting said plate on said frame for reciprocation lengthwise of said slots, inward movement of said fingers through said slots being effective to move said fasteners through said slots into said receiver openings, and means for reciprocating said plate in timed relation to reciprocation of said plungers.

References Cited by the Examiner

UNITED STATES PATENTS

| | | | |
|---|---|---|---|
| 2,669,714 | 2/1954 | Newcomb et al. | 227—99 X |
| 2,752,597 | 7/1956 | Kent et al. | 227—80 |
| 2,950,480 | 8/1960 | Sower | 227—103 |
| 2,953,788 | 9/1960 | Maex et al. | 227—80 |

GRANVILLE Y. CUSTER, Jr., *Primary Examiner.*